United States Patent
Audier

(10) Patent No.: US 8,421,016 B2
(45) Date of Patent: Apr. 16, 2013

(54) LASER-PULSE MATRIX DETECTOR WITH RAPID SUMMATION

(75) Inventor: Marcel-Francis Audier, Paris (FR)

(73) Assignee: Thales, Neuilly sur Seine (FR)

( * ) Notice: Subject to any disclaimer, the term of this patent is extended or adjusted under 35 U.S.C. 154(b) by 629 days.

(21) Appl. No.: 12/598,754

(22) PCT Filed: Apr. 23, 2008

(86) PCT No.: PCT/EP2008/054922
§ 371 (c)(1),
(2), (4) Date: Apr. 16, 2010

(87) PCT Pub. No.: WO2008/135388
PCT Pub. Date: Nov. 13, 2008

(65) Prior Publication Data
US 2010/0207028 A1    Aug. 19, 2010

(30) Foreign Application Priority Data
May 4, 2007   (FR) .................... 07 03244

(51) Int. Cl.
*G01J 5/20*        (2006.01)
(52) U.S. Cl.
USPC ................................... 250/338.4
(58) Field of Classification Search .... 250/338.1–338.5, 250/339.01–339.15, 340, 341.1–341.8, 342–353
See application file for complete search history.

(56) References Cited

U.S. PATENT DOCUMENTS

| | | | |
|---|---|---|---|
| 5,812,190 A | 9/1998 | Audier et al. | |
| 5,856,667 A | 1/1999 | Spirig et al. | |
| 5,998,777 A | 12/1999 | Audier et al. | |
| 6,091,126 A | 7/2000 | Costard et al. | |
| 6,504,141 B1 * | 1/2003 | Kozlowski et al. | 250/214 A |
| 6,534,758 B2 | 3/2003 | Costard et al. | |
| 6,627,868 B2 | 9/2003 | Bois et al. | |
| 6,797,938 B2 | 9/2004 | Bois et al. | |

FOREIGN PATENT DOCUMENTS

EP    1 515 541 A    3/2005

OTHER PUBLICATIONS

U.S. Appl. No. 09/058,967, filed Apr. 13, 1998.
Bedabrata Pain, et al., "A Review of Infrared Readout Electronics for Space Science Sensors", Center for Space Microelectronics Technology, Jul. 15, 1993, pp. 1-47.

* cited by examiner

*Primary Examiner* — Kiho Kim
(74) *Attorney, Agent, or Firm* — LaRiviere, Grubman & Payne, LLP

(57) ABSTRACT

The invention relates to a light pulse sensor (100) with direct injection feedback which comprises a matrix of photosensors, each photosensor comprising a transducer (1) and an integrator (2) comprising an MOSFET injection transistor (21) mounted as a common gate, a feedback amplifier, an integration capacitor (22). The feedback amplifier is a cascode inverting differential amplifier (20') placed between the input of the injection transistor (21) and the gate of this transistor, and, for each photosensor, a demultiplexing circuit (4) is inserted between the transducer (1) and the integrator (2), capable of connecting successively the transducer (1) on the input of the inverting amplifier (20') then on the input of the injection transistor (21).

13 Claims, 3 Drawing Sheets

LASER-PULSE MATRIX DETECTOR WITH RAPID SUMMATION

The field of the invention is that of matrix sensors used for active imaging and more particularly that of matrix sensors of pulses with high detection recurrence.

Active imaging uses a laser light source which illuminates the target with pulses that are usually short and with low recurrence. The target reflects to the sensor a quantity of photons that is greatly reduced by the absorption of the atmosphere, the observation distance, the reflecting power of the target.

Figure 1A:
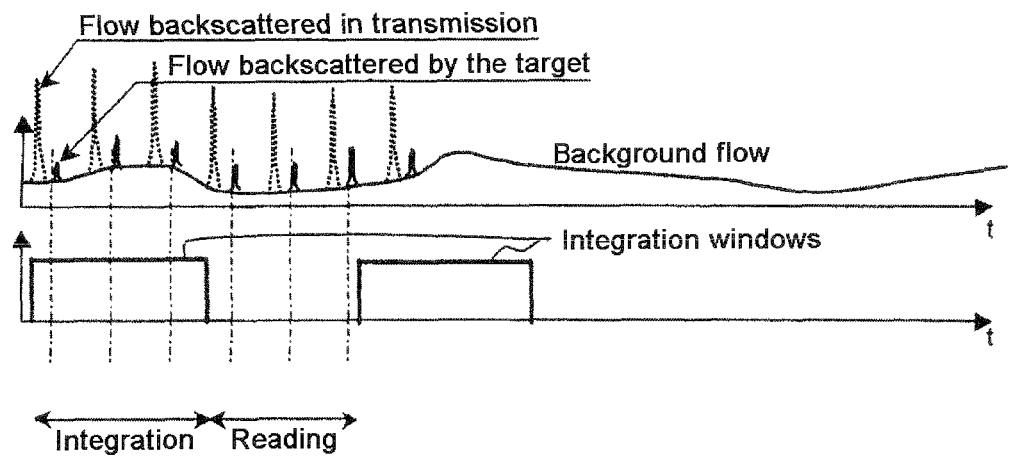

A first solution for detecting a series of pulses with high recurrence consists in using a long integration time during which several successive pulses are integrated before being read as illustrated in FIG. 1a. This solution penalizes the contrast of the image by integrating, between each pulse arrival retransmitted by the target, the backscattered spurious flow on each transmission and that originating from the background. Specifically, the atmospheric spurious flow may reach approximately $10^8$ ph/s/cm² while the received signal is of the order of $10^3$: the received signal is therefore greatly noised. Moreover the spurious flow can be backscattered by the nearby atmosphere but also by the lens of the imaging device if the latter is common to the transmitter and the receiver.

Figure 1B:
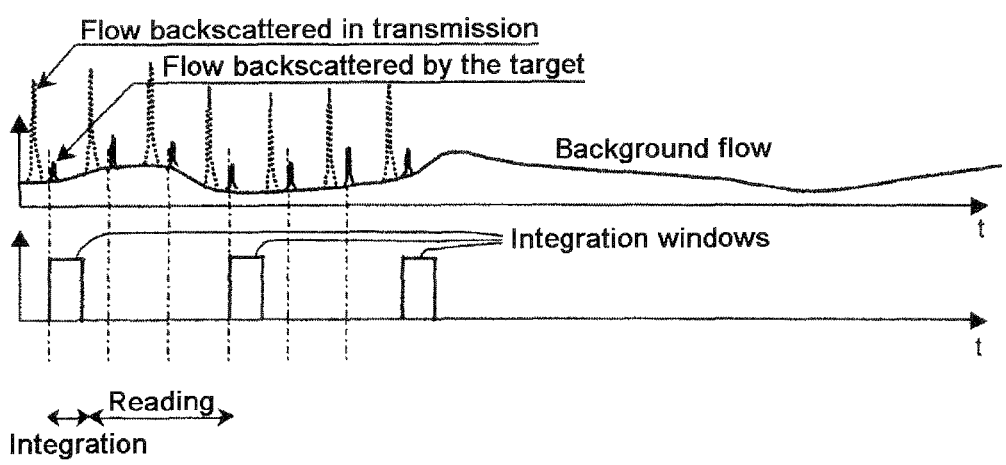

In order not to register this flow of spurious photons, another solution consists in "optically shutting off" the sensor on each pulse transmission, the shut-off being disabled just before the arrival of the pulse backscattered by the target, as illustrated in FIG. 1b. Each pulse is successively integrated and then read.

Note that each photosensor of a matrix sensor comprises a transducer such as a photodiode which converts the received photons into electrons in proportion to the illumination received; these electric loads are then integrated by an integrator and proportionally converted into voltage. A read circuit multiplexes the read signals originating from all the integrators and generates an output video signal containing the luminance information of the matrix sensor.

The shutting off of the sensor during the transmission of a pulse is currently carried out either by holding the integrator associated with each photodiode under reset, or by diverting the current of the photodiodes upstream of the integrator. Preferably, the diversion of the current before the input of the integrator is activated before and just after detection of the pulse, the effective duration of integration thus being limited to a very short space of time which allows a better identification of the target by eliminating the information originating from the background of the scene.

The design of IR matrix sensors is driven by the application which, until recently, consisted in producing a sensor capable of passive imaging in one of the atmospheric transmission spectral bands situated beyond 1 μm.

Depending on the spectral template used, the amplitude of the scene flow to be detected, the desired sensitivity, the spatial resolution of the sensor, the size of the pixels, the frame frequency, etc., various sensor architectures have been developed and optimized.

The main architectures listed are:
"SFD" for Source Follower per diode,
"DI" for direct injection circuit,
"BDI" for a feedback or "buffered" direct injection circuit,
"GMI" for gate modulation input or current mirror circuit,
"CTIA" for capacitive transimpedance amplifier.

The main features, performance and applications of these architectures are described in the article "A Review of Infrared Readout Electronics for Space Science Sensors" by Bedabrata Pain and Eric R. Fossum (SPIE Vol. 2020 Infrared Technology XIX Jul. 15, 1993).

The "SFD" sensor often produced for astronomy applications is very well suited to the production of large matrices with very small pitch. Its noise level is low at very low temperature, but it suffers from a bad linearity and a low instantaneous dynamic range.

The "DI" sensor is more commonly produced. Amongst its main drawbacks, there are:
  a great deterioration in its performance during the detection of very low flows because of a rapid increase in the impedance of the link transistor between diode and integration capacitor,
  a narrow bandwidth incompatible with detecting pulses of low amplitude and high recurrence.

The "BDI" sensor the architecture of which is similar to that of the "DI" sensor with direct injection with an inverting ampli-op between photo-diode and injection transistor, has a risk of instability (starts to oscillate) during the detection of brief light pulses and of high amplitudes.

"GMI" sensors allow the detection of very low flows and have extremely low input noise levels, which has led to its use for detection in band 1 (InGaAs at 1.7 μm). A second advantage lies in the ability to adjust the conversion gain in real time and to adapt it simply to the levels of detected flow. The major drawbacks of the "GMI" sensor are:
  a fairly high nonlinearity and above all a high dispersion in gain and in offsets between photosite (pixel),
  a rapid growth in the space requirement of the photosite for large bandwidths and low noise levels.

The "CTIA" sensor is an inverting amplifier with an integration capacitor used in a feedback loop. The noise levels, the linearity and the bandwidths achieved are amongst the best and make it a sensor that is well suited to the detection of very low flows (<$10^6$ m ph/s/cm²), and to the detection of brief laser monopulses.

During the integration phase, the loads supplied by the photodiode are stored on the input node of the amplifier and it is a precise copy of the amount of this load that is copied to the integration capacitor. The integrated load is kept until the clearance of that present at the amplifier input. The latter is normally deleted by short circuit of the integration capacitor (reset) but is also slowly cleared by the leak-resistance of the photodiode, thus fixing a low chopping frequency.

In a mode of detecting isolated recurrent pulses with, between each pulse, the operations of rapid shut-off and reset of the photodiode (to provide protection against backscatter and too great an integration of the background signal), the load accumulated at the input of the amplifier, following the detection of a previous pulse, is partially cleared during the reconnection of the photodiode because of the finite gain of the amplifier of the integrator. The result of this is considerable difficulty in performing a linear post-integration function.

At the end of the '90s, the emerging interest in passive imaging at very low light level, in particular in the first infrared spectral band, and for active imaging led to the development of matrix sensors capable of detecting very weak currents and short pulses with very low amplitudes. Such a sensor, amongst the first, is described in the article entitled "Very Wide Dynamic Range SWIR Sensors for Very Low Background Applications" by Robert F. Cannata and al (Indigo Systems Corporation). This involves a sensor of the CTIA type with dual gain and very high coefficient of amplification.

But all these sensors suffer from several drawbacks, specifically:

Each illumination and acquisition must be several milliseconds apart, necessary for the reading of the sensor and then its resetting; such a sensor is therefore limited to a rate of approximately 10 Hz, and even a loss of information between 2 pulses.

Such sensors operate with conventional post-integration that is to say outside the focal plane, with one read for each pulse which increases the reading noise during this post-integration phase.

The object of the invention is to obtain a pulse sensor with a high rate having a high signal-to-noise ratio.

More precisely, the subject of the invention is a light pulse sensor with direct injection feedback which comprises a matrix of photosensors, each photosensor comprising a transducer and an integrator comprising an MOSFET injection transistor mounted as a common gate, a feedback amplifier, an integration capacitor. It is mainly characterized in that the feedback amplifier is a cascode inverting differential amplifier placed between the input of the injection transistor and the gate of this transistor, and in that it comprises, for each photosensor, a demultiplexing circuit inserted between the transducer and the integrator, capable of connecting successively the transducer on the input of the inverting amplifier then on the input of the injection transistor.

According to one feature of the invention, the demultiplexing circuit comprises two transistors $\overline{\phi_{gating}}$ and $\phi_{gating}$ controlled in phase opposition for the purpose of ensuring a rapid shut-off of the photosensor.

The closure of the first transistor or switch connects the transducer to a reference voltage (Vref) applied to the input of the inverting amplifier, via the low resistance of the switch; the opening of the second transistor or switch isolates the photosensor from its integrator. The reconnection of the integrator to the photosensor is obtained by opening the first switch and simultaneously closing the second switch.

Preferably, the sensor comprises a feedback capacitor $C_{BL}$ placed in parallel with the differential amplifier, capable of optimizing the bandwidth of this amplifier.

Advantageously it comprises a screen transistor Mécr placed between the output of the injection transistor Minj and the integration capacitor Cint.

If necessary, it also comprises a storage circuit connected to the integrator.

The light pulses are for example IR pulses which have a rate higher than a few hundred Hz.

The invention also relates to a method for detecting light pulses by means of a matrix of photosensors, which comprises, for each photosensor, steps of integrating loads by means of an integrator then of reading these loads, characterized in that the integration step comprises:

a step of opening the integrator during the receipt of each pulse then shutting off the integrator between two receptions, of summating the loads integrated by the integrator over several pulses, and in that the reading step comprises a read of the sum of the loads integrated over several pulses.

The opening of the integrator is advantageously obtained by two switches operating in phase opposition.

Since each photosensor comprises a transducer, the shutting off of the integrator is obtained by closing a first switch and simultaneously opening the second switch. The closure of the first switch connects the transducer to a reference voltage (Vref) via the low resistance of the switch, and the opening of the second switch isolates the photosensor from its integrator. The reconnection of the integrator to the photosensor is obtained by opening the first switch and simultaneously closing the second switch.

Figure 2:
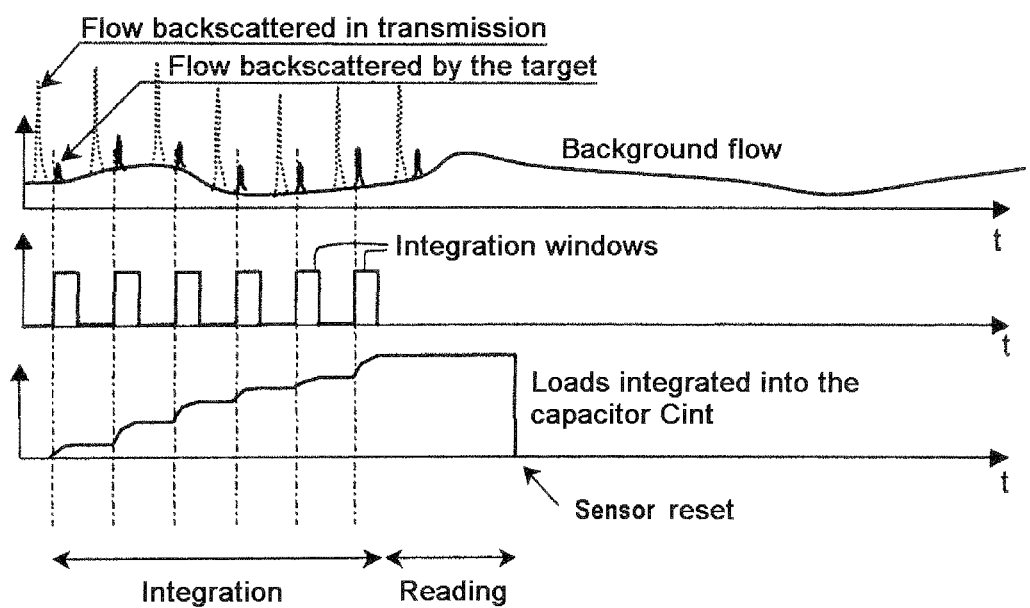
Figure 3:
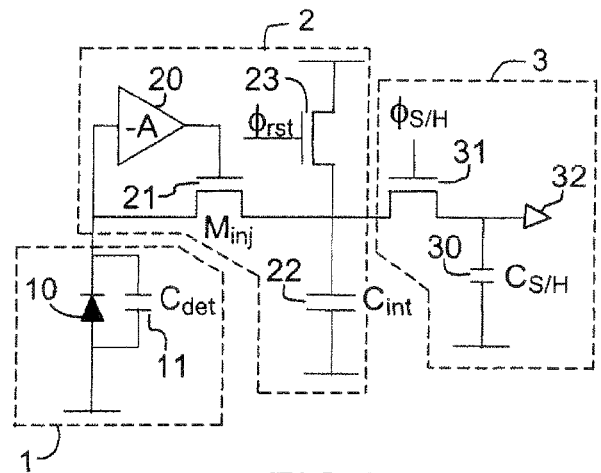
Figure 4:
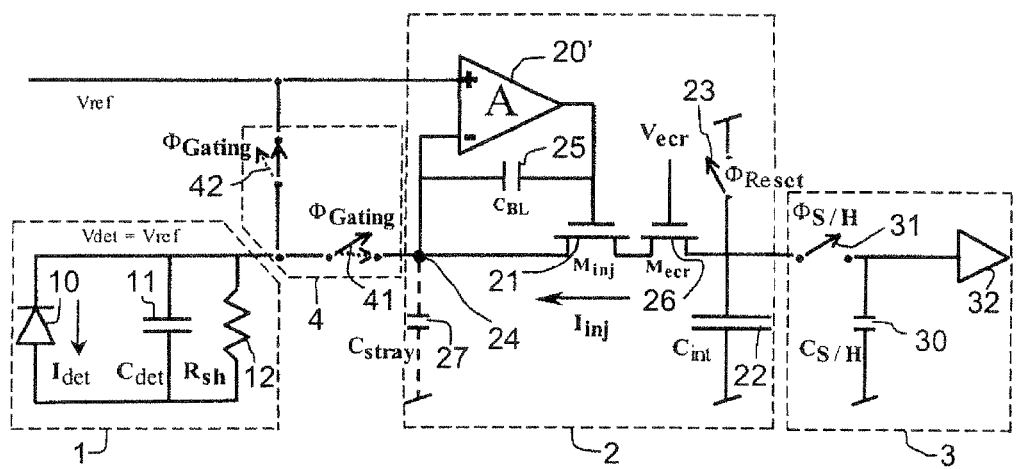

Other features and advantages of the invention will appear on reading the following detailed description given as a non-limiting example and with reference to the appended drawings in which:

FIGS. 1a and 1b already described illustrate schematically the operation of two sensors according to the prior art, the first (FIG. 1a) having an integration duration during which several pulses are integrated before being read, the second (FIG. 1b) having an integration duration limited to that of the pulse reflected back, each integration being followed by a read, FIG. 2 illustrates schematically the operation of a sensor according to the invention, FIG. 3 represents schematically the main elements of an example of a "BDI" sensor according to the prior art, FIG. 4 represents schematically the main elements of an example of a sensor according to the invention.

From one figure to the other, the same elements are indicated by the same references.

The sensor according to the invention is a rapid shutoff sensor capable of sensing short pulses at a high rate and of summing (post-integrating) them before reading them, as illustrated in FIG. 2. This figure represents first of all as a function of time, the effective flow corresponding to the pulses reflected back by the target and the spurious flow originating from the background and that resulting from the atmospheric backscatter on transmission (and/or optionally from the lens of the device). Indicated below are the succession of integration windows, integration being disabled when the photosensor is optically shut off that is to say between two pulses reflected back by the target; the flow backscattered on transmission is thus eliminated. Gradually as these integration windows succeed one another, the loads integrated by the integration capacitor of the photosensor (shown below) accumulate in order to be read on one occasion after receipt of several pulses.

The pulses are laser pulses and more generally light pulses.

The sensor according to the invention is based on the configuration of a sensor of the BDI type, that is to say a buffered direct injection sensor.

A sensor of the BDI type described with reference to FIG. 3 comprises:

a transducer 1 such as a photodiode 10 with, in parallel, a detection capacitor 11, an integrator 2 which comprises an MOSFET (Minj) transistor 21 mounted as a common gate and used as an injection transistor, an inverting op-amplifier 20 between the transducer 1 and the injection transistor 21, having a feedback function making it possible to reduce the impedance of the injection transistor proportionally to the gain of the amplifier and consequently to increase the injection bandwidth in the same proportions, an integration capacitor 22 and its reset transistor 23.

This sensor advantageously comprises a storage circuit 3 including a "Sample and Hold" storage capacitor 30, an associated transistor 31 and an amplifier 32.

According to the invention, the sensor 100 also comprises the following elements that can be seen in FIG. 4:

A demultiplexer 4 successively connecting the transducer 1 to a reference voltage (Vref) then to the input of the injection transistor (Minj). This demultiplexer comprises transistors $\overline{\phi_{gating}}$ 41 and $\phi_{gating}$ 42 which are controlled in perfect phase opposition in order to minimize the injection of loads linked to the closure of the transistor 41 $\overline{\phi_{gating}}$ and its impact on the modulation of potential of the input node 24 of the integrator 4.

A cascode inverting differential amplifier (A) 20', with large gain and bandwidth, placed in a feedback loop between the input of the injection transistor 21 and the gate of this transistor. This amplifier stabilizes the input potential of the injection transistor 21 and increases the bandwidth thereof. The bandwidth of the amplifier is preferably adjusted by a feedback capacitor 25 CBL, in order to prevent the oscillations of the circuit when rapid pulses of large amplitudes are detected. Its optimization is carried out as a function of the features of the pulses to be detected (amplitude, duration and recurrence).

Preferably, the integrator 2 also comprises a screen transistor 26 (Mécr) placed between the output of the injection transistor 21 (Minj) and the integration capacitor 22 (Cint), which produces a cascode assembly making it possible to minimize the potential modulation of the injection transistor drain as a function of the integrated load, thus increasing the decoupling between the integration capacitor 22 and the input 24 of the integrator. Advantageously, this transistor 26 operates in saturation which limits the maximum discharge of the potential of the integration capacitor 22 to Vecr-Vth-5. $\phi$T (Vecr=constant potential of the screen transistor gate, Vth=threshold voltage of the screen transistor and $\phi$T=thermal potential).

The transducer 1 comprises a leakage resistor (shunt resistor) 12 the value of which limits the maximum time allocated to detection (time constant: (Cdet+Cstray)Rsh). The figure indicates a capacitor Cstray 27 in order to materialize a spurious capacitor of the integrator.

This architecture allows:
  a rapid transfer of the photoelectrons generated by the transducer 1 to the integration node 22 (capacitor),
  a virtually perfect isolation between the integration node 22 and transducer 1,
  a precise fixing of the potentials of the transducer 1 and of the input 24 of the integrator at a constant value during the shutoff and integration phases,
  the possibility of using large integration capacitors allowing the summation of a large number of pulses.

This gives a matrix sensor capable of sensing light pulses emitted at a high rate that can exceed several tens of kHz.

The sensor according to the invention operates in the following manner.

In the laser transmission phase, the transistor or switch 42 $\phi_{gating}$ is closed and connects the transducer 1 to the voltage Vref applied to the input of the amplifier 20' via a very low resistance Rgating typically less than a few hundreds of Q. The very low time constant Cdet.Rgating allows a rapid clearance of the current generated by the photodiode in response to the spurious backscatter at the time of transmission.

Prior to the return of the laser pulse backscattered by the target, the transistor or switch 42 $\phi_{gating}$ is open, disconnecting the photodiode from the reference voltage Vref. Simultaneously, the transistor or switch 41 $\overline{\phi_{gating}}$ is closed and connects the photodiode to the input of the integrator 2.

The large gain (typically more than 60 dB) feedback differential amplifier 20' "A" precisely holds the potential Vref on the transducer 1 and the input 24 of the integrator.

On receipt of the return of the laser pulse backscattered by the target, the current generated by the transducer 1 passes through the injection transistor 21 and is integrated into the capacitor Cint 22 with a time constant Cdet/((A+1).Gm), A being the gain of the amplifier. Gm the transduction of the injection transistor.

In a low injection regime. Gm is independent of the size of the transistor 21 and varies proportionally to the injected current Iinj (Gm≈(q.Iinj)/(KT)) (q=load of the electron, K=Boltzmann constant, T=temperature of the component). Therefore, as an illustration, a current pulse of 1000 photoelectrons in 100 ns delivered by a sensor with a capacitance of 200 fF operating at 77 K coupled to a BDI integrator the amplifier of which has a gain of 60 dB will be transferred to the integration capacitor with an initial time constant of 2 ns (excluding limitation by the finite bandwidth of the amplifier).

At the end of transfer, the transistor or switch 41 $\overline{\phi_{gating}}$ is again open and the transistor or switch 42 $\phi_{gating}$ is closed thus reconnecting the transducer 1 to the reference voltage low-impedance source, awaiting a new transmission phase.

Several pulses are thus transferred and summed in the integration capacitor Cint 22 during one and the same frame period. The result of the summation is then read in a few milliseconds.

The sensor according to the invention therefore has the following advantages:
  of no longer being limited in sensing rate notably because of the limited rate of the read circuit and of not reducing the loss of information between 2 pulses and thus being able to operate at a rate of approximately 20 kHz,
  of reducing the deterioration of the signal-to-noise ratio caused by the additional noise of each read, since there is only one read for several pulses that are detected and then summed in the integrator, thanks to the post-integration within the sensor prior to its being read and not outside the focal plane.

The invention claimed is:

1. A light pulse sensor (100) with direct injection feedback which comprises a matrix of photosensors, each photosensor comprising a transducer (1) and an integrator (2) comprising an MOSFET injection transistor (21) mounted as a common gate, a feedback amplifier, an integration capacitor (22), characterized in that the feedback amplifier is a cascode inverting differential amplifier (20') placed between the input of the injection transistor (21) and the gate of this transistor, and in that it comprises, for each photosensor, a demultiplexing circuit (4) inserted between the transducer (1) and the integrator (2), capable of connecting successively the transducer (1) on the reference voltage of the inverting amplifier (20') then on the input of the injection transistor (21).

2. The matrix sensor (100) as claimed in the preceding claim, characterized in that the demultiplexing circuit (4) comprises two transistors $\overline{\Phi_{gating}}$ (41) and $\Phi_{gating}$ (42) controlled in phase opposition for the purpose of ensuring a rapid shut-off of the photosensor.

3. The matrix sensor (100) as claimed in one of the preceding claims, characterized in that it comprises a feedback capacitor $C_{BL}$ (25) placed in parallel with the differential amplifier (20'), capable of optimizing the bandwidth of this amplifier.

4. The matrix sensor (100) according to claims 1 or 2 further comprising a screen transistor Mécr (26) placed between the output of the injection transistor (21) and the integration capacitor (22).

5. The matrix sensor (100) according to any of claim 1 or 2, in which the transducer (1) comprises a photodiode (10).

6. The matrix sensor (100) according to claim 1 or 2 further comprising a storage circuit (3) connected to the integrator (2).

7. The matrix sensor (100) according to any of claims 1 or 2, in which the light pulses are IR pulses.

8. The matrix sensor (100) according to any of claim 1 or 2, in which the light pulses have a rate higher than a few hundred Hertz.

9. A method for detecting light pulses with a photosensor according to claim 1, and for each photosensor, steps of integrating loads by means of an integrator then reading these loads, wherein the integration step comprises:
   opening the integrator during the receipt of each light pulse then shutting off the integrator between two receptions,
   summating the loads integrated by the integrator over several light pulses, and the reading step comprises a read of the sum of the loads integrated over several light pulses.

10. The method for detecting light pulses as claimed in the preceding claim, characterized in that the opening of the integrator is obtained by two switches operating in phase opposition.

11. The method for detecting light pulses as claimed in the preceding claim, characterized in that each photosensor comprises a transducer, the shutting off of the integrator is obtained by closing a first switch and simultaneously opening the second switch.

12. A method for detecting laser pulses as claimed in one of claims 9 to 11, characterized in that the light pulses are IR pulses.

13. The method for detecting laser pulses according to any of claim 9, 10, or 11, in which the light pulses have as rate that is higher than a few hundred Hertz.

\* \* \* \* \*